United States Patent [19]

Kosaka et al.

[11] 3,801,736

[45] Apr. 2, 1974

[54] COLOR REPRODUCTION METHOD IN A HALFTONE DOT

[75] Inventors: Takeshi Kosaka; Yoshio Yuasa, both of Osaka, Japan

[73] Assignee: Minolta Camera Kabushiki Kaisha, Osaka-shi, Japan

[22] Filed: June 21, 1972

[21] Appl. No.: 265,020

[30] Foreign Application Priority Data

June 23, 1971 Japan .............................. 46-45480

[52] U.S. Cl. .............................................. 178/5.2 A

[51] Int. Cl. .............................................. H04n 1/46

[58] Field of Search ....... 178/5.2 A, 6.6 B; 346/745; 101/151, 211

[56] References Cited

UNITED STATES PATENTS

| | | | |
|---|---|---|---|
| 3,651,246 | 3/1972 | Bergero | 178/5.2 R |
| 3,381,612 | 5/1968 | Lecha | 178/5.2 A |
| 3,393,269 | 7/1968 | Zeuthen | 178/6.6 B |

*Primary Examiner*—Robert L. Griffin
*Assistant Examiner*—George G. Stellar
*Attorney, Agent, or Firm*—Wolder & Gross

[57] ABSTRACT

In the method of producing a color reproduction of an original on a substrate in halftone dots of three different color superimposed layers of transparent material having predetermined thicknesses, in which, $D_1$, $D_2$ and $D_3$ respectively denote the predetermined thicknesses of the first, second and third transparent color material layers, and $T_{11}$ denotes the transparency for the first primary color of a unit thickness of the first layer, $T_{22}$ denotes the transparency for the second primary color of a unit thickness of the second layer, and $T_{33}$ denotes the transparency for the third primary color of a unit thickness of the third layer, $X_1$, $X_2$ and $X_3$ respectively denote the occupancy area of the halftone dots of the first primary color in the unit with respect to said original, the occupancy area of the halftone dots of the second primary color and the occupancy of area of the halftone dots of the third primary color, and $d_{11}$, $d_{22}$ and $d_{33}$ respectively denote the transparency of the first primary color of the halftone dots of the first color with respect to the thickness of each of said areas, the transparency of the second primary color of the halftone dots of the second color and the transparency of the third primary color of the halftone dots of the third color, the area of the halftone dots of every color are determined by the equations, $$(T_{11})^{D_1} = 1 - X_1 + X_1 \cdot (d_{11})$$
$$(T_{22})^{D_2} = 1 - X_2 + X_2 \cdot (d_{22})$$
$$(T_{33})^{D_3} = 1 - X_3 + X_3 \cdot (d_{33}).$$

1 Claim, 5 Drawing Figures

FIG. 4

| SAMPLE | COLOR OF THE SAMPLE | REPRODUCED COLOR OF SAID SAMPLE | COLOR DIFFERENCES BETWEEN SAID COLOR OF THE SAMPLE AND SAID REPRODUCED COLOR OF SAID SAMPLE |
|---|---|---|---|
| ① | x 0.369<br>y 0.329<br>Y 0.300 | 0.362<br>0.329<br>0.251 | 6.28 (NBS) |
| ② | x 0.379<br>y 0.395<br>Y 0.300 | 0.375<br>0.396<br>0.252 | 5.23 |
| ③ | x 0.377<br>y 0.488<br>Y 0.300 | 0.371<br>0.496<br>0.265 | 6.24 |
| ④ | x 0.289<br>y 0.396<br>Y 0.300 | 0.269<br>0.396<br>0.257 | 11.99 |
| ⑤ | x 0.264<br>y 0.284<br>Y 0.300 | 0.254<br>0.281<br>0.256 | 7.31 |
| ⑥ | x 0.326<br>y 0.258<br>Y 0.300 | 0.320<br>0.258<br>0.259 | 5.24 |
| ⑦ | x 0.438<br>y 0.460<br>Y 0.591 | 0.424<br>0.467<br>0.527 | 11.06 |
| ⑧ | x 0.369<br>y 0.351<br>Y 0.591 | 0.354<br>0.354<br>0.527 | 11.52 |

PATENTED APR 2 1974 3,801,736

SHEET 3 OF 3

COLOR REPRODUCTION METHOD IN A HALFTONE DOT

BACKGROUND OF THE INVENTION

The present invention relates to a color reproduction method based on a color reproduction system in which halftone dots are used and more particularly to a method in which the thicknesses of three kinds of transparent color halftone dot materials are set up in advance and colors are reproduced according to the colors of an object by varying the areas of the different halftone dots.

With respect to color reproduction utilizing halftone dots, Neugebauer's equation has been proposed. However, Neugebauer's equation is highly complex and is practically very difficult to precisely apply to the color printing process, for example, to determine the operation of each of the steps in the color printing process according to this equation, thereby controlling the various steps.

Accordingly, in conventional color printing color reproduction is not effected by established theory but by experience or intuition, and, when necessary, by way of trial and error.

Moreover, there is some uncertainty, based on experience or intuition, in such a process. Therefore, the reproduction of colors is not uniform and the correct reproduction is difficult to attain. Also, color reproduction effected by way of trial and error becomes expensive.

The present invention, while it provides an approximate theoretical formula which is easy to be applied to color reproduction, facilitates high fidelity color reproduction, by a method based on such approximate theoretical formula.

THE OBJECT OF THE INVENTION

One object of the present invention is to provide a color reproduction method by which color reproduction that is accurate and faithful to an original is effected on a substrate in halftone dots.

Another object of the present invention, in reproducing the colors of an original on a substrate in halftone dots, whose thickness is predetermined, with respect to each color of the transparent color material in three colors, is to provide a method of finding the thickness of each layer where layers of said transparent color material forming the halftone dots of said three colors are superimposed for color reproduction, thereby determining the occupancy area of the area covered on the substrate of said halftone dots in order to effect accurate color reproduction.

Still another object of the present invention is to provide a color reproduction method in halftone dots employing a simple theoretical formula relating to the occupancy area with respect to a substrate in the area of halftone dots, which is accurate in the colors of an original reproduced in said halftone dots, whose thicknesses are predetermined, with respect to various transparent color materials of three colors, are superimposed on the substrate, and the thickness of each layer in reproducing the colors of the original by superimposing layers of the transparent material of the three colors and of reproducing the colors by forming halftone dots in three colors on the substrate, while adjusting the area of the halftone dot in the three colors corresponding with the colors of the original to said theoretical formula and thus controlling it.

SUMMARY OF THE INVENTION

The present invention relates to a color reproduction method in halftone dot comprising the steps of:

determining the thicknesses of layers for reproducing the colors of an original by superimposing the layers of transparent color materials in three colors; and determining respectively the dot areas in three colors in accordance with the equation $$(T_{11})^{D_1} = 1 - X_1 + X_1 \cdot (d_{11})$$

$$(T_{22})^{D_2} = 1 - X_2 + X_2 \cdot (d_{22})$$

$(T_{33})^{D_3} = 1 - X_3 + X_3 \cdot (d_{33})$ thereby reproducing the colors of the original on a substrate, wherein:

$T_{11}$ denotes the transparency of the first primary color of a layer of unit thickness of said first transparent color material;

$T_{22}$ denotes the transparency of the second primary color of a layer of unit thickness of the second transparent color material;

$T_{33}$ denotes the transparency of the third primary color of a layer of unit thickness of the third transparent color material;

$D_1$ denotes the thickness, which is hereinabove found of the first layer;

$D_2$ denotes the thickness, which is hereinabove found of the second layer;

$D_3$ denotes the thickness, which is hereinabove found of the third layer;

$X_1$ denotes the occupancy of the area which the first dot occupies as a dot with respect to a substrate, $X_2$ denotes the occupancy of the area which the second dot occupies as a dot with respect to a substrate, $X_3$ denotes the occupancy of the area which the third dot occupies as a dot with respect to a substrate; and $d_{11}$ denotes the transparency of the first primary color of the first dot having a predetermined thickness, $d_{22}$ denotes the transparency of the second primary color of the second dot having a predetermined thickness, $d_{33}$ denotes the transparency of the third primary color of the third dot having a predetermined thickness.

BRIEF DESCRIPTION OF THE DRAWINGS

FIG. 4 is a table showing the simulation of the method according to the present invention.

DESCRIPTION OF THE PREFERRED EMBODIMENT

Figure 1:
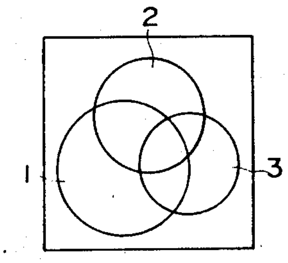
FIG. 1 is a plan showing a magnified unit in a small area which constitutes a unit in a halftone process.

Prior to the description of the present invention, Neugebauer's equation is explained as follows:

FIG. 1 is a magnified division of a small area constituting a unit of a picture surface which is printed in a halftone process and reference numerals 1, 2 and 3 respectivey illustrate halftone dots in three primary colors.

One picture surface is made up of divisions or increments which adjoin each other and are arranged crosswise, having the same area as such a small division as was stated above, and the small division becomes a unit area in cases where dot images are formed.

Now, when $X_1$, $X_2$ and $X_3$ denote the occupancy of area of dots 1, 2 and 3 within such a unit area, $C_{1\lambda}$, $C_{2\lambda}$, and $C_{3\lambda}$ denote the single spectral reflectance at which one halftone dot is not superimposed on the other, $C_{4\lambda}$ denotes the spectral reflectance of the part at which dots 1 and 2 overlap, $C_{5\lambda}$ denotes the spectral reflectance of the part at which dots 2 and 3 overlap, $C_{6\lambda}$ denotes the spectral reflectance of the part at which dots 1 and 3 overlap, $C_{7\lambda}$ denotes the spectral reflectance of the part at which dots 1, 2 and 3 overlap, and $C_{0\lambda}$ denotes the spectral reflectance of a substrate (ground paper and so on), $R_\lambda$ that is the combined spectral reflectance in the above unit area is expressed as follows:

$$R\lambda = (1-X_1)(1-X_2)(1-X_3)(C_{0\lambda}) + X_1(1-X_2)(1-X_3)(C_{1\lambda}) + X_2(1-X_3)(1-X_1)(C_{2\lambda}) + X_3(1-X_1)(1-X_2)(C_{3\lambda}) + X_1 \cdot X_2(1-X_3)(C_{4\lambda}) + X_2 \cdot X_3(1-X_1)(C_{5\lambda}) + X_3 \cdot X_1(1-X_2)(C_{6\lambda}) + X_1 \cdot X_2 \cdot X_3(C_{7\lambda}) \quad (1)$$

What is expressed by the product of such three terms as $X_1$. $X_2$· $X_3$ and $(1-X_1)\cdot(1-X_2)\cdot(1-X_3)$ in the above formula is introduced by the solution of the integral of probability.

Hence, the area where the above three dots do not exist all without exception is given by the product of the probability $(1-X_1)\cdot(1-X_2)\cdot(1-X_3)$ with no dots existing in the above unit area, the area of the part where one kind of dot, for example dot 1 is not superimposed on other kinds of dots, for example dots 2 and 3, is given by the product of the probability $X_1$ with dot 1 existing within the above unit area and of the probability $(1-X_2)\cdot(1-X_3)$ with no dots 2 and 3 existing within said unit area, which constitutes $X_1\cdot(1-X_2)\cdot(1-X_3)$, the area of the part where two kinds of dots, for example dots 1 and 2, are superimposed on each other but not on another kind of dot, for example dot 3 constitutes $X_1 \cdot X_2 \cdot (1-X_3)$, and further the area of the part where all of three kinds of dots 1, 2 and 3 are superimposed constitutes $X_1 \cdot X_2 \cdot X_3$.

In this case, when $X_R \cdot Y_R \cdot Z_R$ denote a tristimulus value in a CIE color system with respect to the whole colors of the above unit areas and when $\bar{x}$ $\bar{y}$ and $\bar{z}$ denote the tristimulus value of the spectrum associated with wavelength λ, the following formula is constituted:

$$X_R = C_1 \int (P_{0\lambda}) R_\lambda \, \bar{x} d\lambda)$$
$$Y_R = C_1 \int (P_{0\lambda}) R_\lambda \, \bar{y} d\lambda)$$
$$Z_R = C_1 \int (P_{0\lambda}) R_\lambda \, \bar{z} d\lambda) \quad (2)$$

In this case, $P_0$ as shown above denotes the spectral energy distribution of a reference light source.

Next, when $E_\lambda$ denotes the spectral energy characteristic of the part corresponding to the above-mentioned unit area of the object whose color is to be reproduced and when $X_E \cdot Y_E \cdot Z_E$ denote the tristimulus value of said energy characteristic, which is expressed by the CIE color system, the following formula applies:

$$X_E = C_2 \int E \lambda \, . \bar{x} . d\lambda$$
$$Y_E = C_2 \int E \lambda \, . \bar{y} . d\lambda$$
$$Z_E = C_2 \int E \lambda \, . \bar{z} . d\lambda \quad (3)$$

In this case, if its color is reproduced correctly, the following relationship occurs:

$X_R = X_E$, $Y_R = Y_E$, and $Z_R = Z_E$

Thus, when $R\lambda$ of formula (1) is substituted for such an equality, the following formula is expressed:

$$X_E = C_2 [ \int (1-X_1)(1-X_2)(1-X_3)(C_{0\lambda})(P_{0\lambda}) \bar{x} d\lambda + \int X_1(1-X_2)(1-X_3)(C_{1\lambda})(P_{0\lambda}) \bar{x} d\lambda + 2IX_2(1-X_3)(1-X_1)(C_{2\lambda})(P_{0\lambda}) \bar{x} d\lambda + 2IX_3(1-X_1)(1-X_2)(C_{3\lambda})(P_{0\lambda}) \bar{x} d\lambda + 2IX_1X_2(1-X_3)(C_{4\lambda})(P_{0\lambda}) \bar{x} d\lambda + 2IX_2X_3(1-X_1)(C_{5\lambda})(P_{0\lambda}) \bar{x} d\lambda + \int X_3X_1(1-X_2)(C_{6\lambda})(P_{0\lambda}) \bar{x} d\lambda + \int X_1 \cdot X_2 \cdot X_3 (C_{7\lambda})(P_{0\lambda}) \bar{x} d\lambda]$$

Similarly, as regards $Y_E$, $(\bar{x}\, d\lambda)$ in each of the terms enumerated above is substituted for $(\bar{y}\, d\lambda)$, and, as regards $X_E$, said $\bar{x}\, d\lambda$ for $(\bar{z}\, d\lambda)$.

Since $X_1$, $X_2$, $X_3$, $(1-X_1)$, $(1-X_2)$ (and $1-X_3$) in the above formula are constants which are not associated with the wavelength λ of light, these are placed out of integral symbols, and the following formula results:

$$C_2 \int (C_{0\lambda})(P_{0\lambda}) \bar{x} d\lambda = (A_{x0})$$
$$C_2 \int (C_{1\lambda})(P_{0\lambda}) \bar{x} d\lambda = (A_{x1})$$
$$C_2 \int (C_{2\lambda})(P_{0\lambda}) \bar{x} d\lambda = (A_{x2})$$
$$C_2 \int (C_{3\lambda})(P_{0\lambda}) \bar{x} d\lambda = (A_{x3})$$
$$C_2 \int (C_{4\lambda})(P_{0\lambda}) \bar{x} d\lambda = (A_{x4})$$
$$C_2 \int (C_{5\lambda})(P_{0\lambda}) \bar{x} d\lambda = (A_{x5})$$
$$C_2 \int (C_{6\lambda})(P_{0\lambda}) \bar{x} d\lambda = (A_{x6})$$
$$C_2 \int (C_{7\lambda})(P_{0\lambda}) \bar{x} d\lambda = (A_{x7})$$

Similarly, when the formula $C_2 \int (C_{i\lambda})(P_{0\lambda}) \bar{y} d\lambda = (A_{yi})$ However, $i = 1 \sim 7$ $C_2 \int (C_{i\lambda})(P_{0\lambda}) \bar{z} d\lambda = (A_{zi})$ However, $i = 1 \sim 7$ is constituted, the following formula 4 is expressed:

$$X_E = (1-X_1)(1-X_2)(1-X_3)(A_{x0}) + X_1(1-X_2)(1-X_3)(A_{x1}) + X_2(1-X_3)(1-X_1)(A_{x2}) + X_3(1-X_1)(1-X_2)(A_{x3}) + X_1X_2(1-X_3)(A_{x4}) + X_2X_3(1-X_1)(A_{x5}) + X_3X_1(1-X_2)(A_{x6}) + X_1X_2X_3(X \times 7)$$

$$YE = (1-X_1)(1-X_2)(1-X_3)(A_{y0}) + X_1(1-X_2)(1-X_3)(A_{y1}) + X_2(1-X_3)(1-X_1)(A_{y2}) + X_3(1-X_1)(1-X_2)(A_{y3}) + X_1X_2(1-X_3)(A_{y4}) + X_2X_3(1-X_1)(A_{y5}) + X_3X_1(1-X_2)(A_{y6}) + X_1X_2X_3(A_{y7})$$

$$ZE = (1-X_1)(1-X_2)(1-X_3)(A_{z0}) + X_1(1-X_2)(1-X_3)(A_{z1}) + X_2(1-X_3)(1-X_1)(A_{z2}) + X_3(1-X_1)(1-X_2)(A_{z3}) + X_1X_2(1-X_3)(A_{z4}) + X_2X_3(1-X_1)(A_{z5}) + X_3X_1(1-X_2)(A_{z6}) + X_1X_2X_3(A_{z7}) \quad (4)$$

In the above formula 4 $X_E$, $Y_E$ and $Z_E$ respectively may measure objects and the values of $(A_{x0}) \sim (A_{x7})$, $(A_{y0}) \sim (A_{y7})$, and $(A_{z0}) \sim (A_{z8})$ may be determined by the substrate used (paper and so on) and the printing ink used. Hence, a finding of dot areas, that is, $X_1$, $X_2$, and $X_3$ will suffice for formula 4. However it is very difficult to solve $X_1$, $X_2$ and $X_3$ of the above formula 4, because, if $X_2$ and $X_3$ are eliminated and an equation is found with respect to $X_1$, an equation of the eighth degree, which should be solved, results.

However, from the practical point of view, $X_1$, $X_2$, and $X_3$, whose values are smaller than 1, are the occupancy of areas of colored dots in the unit area illustrated in FIG. 1, and hence these higher degree terms may be omitted to be solved.

This equation can be realized in a printing process by setting up its analogue solution. However, the algebraically simultaneous equations of formula 4 are not suitable for application to such analogue solution. In practicing the present invention formula 4 is approximately transformed into one form that may be suitably applied to said analogue solution.

Firstly, on the basis of a proper assumption formula 1 may be further simplified.

Figure 2:
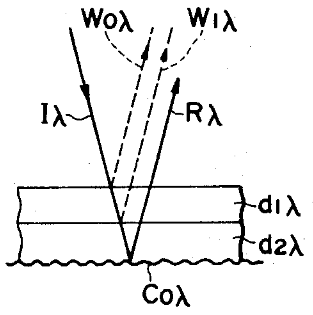
FIG. 2 is a side sectional view showing the reflected state of light incident upon a reflecting substance having two layers of transparent color materials.

This assumption is that, as illustrated in FIG. 2, in cases where light of spectral energy distribution $I\lambda$ is intercepted by two transparent layers having spectral transmittivities $d_{2\lambda}$ and $d_{1\lambda}$, is reflected by the ground paper of spectral reflectance $C_{0\lambda}$, there are the reflected light $W_{0\lambda}$ and $W_{1\lambda}$ which are shown by a broken line and the reflected light which is shown by a solid line $R\lambda$, but, since the strengths of the reflected lights $W_{0\lambda}$ and $W_{1\lambda}$ are very small, its color is produced by reflected light $R\lambda$ and with respect to the combined transmittivity of the above two layers Beer's law is applicable.

In formula 1 $C_{0\lambda}$ denotes the spectral reflectance of a substrate (a ground paper), but this is when an ink layer is considered to be double, because, if $d_{1\lambda}$, $d_{2\lambda}$ and $d_{3\lambda}$ respectively denote the spectral transmittivity of each ink of dots 1, 2 and 3, then light incident upon the ink layer, is reflected by the ground paper and again passes through the ink layer.

According to Beer's law, $C_{1\lambda}$, $C_{2\lambda}$, $C_{3\lambda}$, $C_{4\lambda}$, $C_{5\lambda}$, $C_{6\lambda}$, and $C_{7\lambda}$ in formula 1 respectively turn into:

$$C_{1\lambda} = C_{0\lambda} \cdot d_{1\lambda}$$
$$C_{2\lambda} = C_{0\lambda} \cdot d_{2\lambda}$$
$$C_{3\lambda} = C_{0\lambda} \cdot d_{3\lambda}$$
$$C_{4\lambda} = C_{0\lambda} \cdot d_{1\lambda} \cdot d\lambda$$
$$C_{5\lambda} = C_{0\lambda} \cdot d_{2\lambda} \cdot d_{3\lambda}$$
$$C_{6\lambda} = C_{0\lambda} \cdot d_{3\lambda} \cdot d_{1\lambda}$$
$$C_{7\lambda} = C_{0\lambda} \cdot d_{1\lambda} \cdot d_{2\lambda} \cdot d_{3\lambda}$$

When the above are substituted in formula 1 and arranged, they result in:

$$R\lambda \quad C_{0\lambda} \quad (1-X_1 + X_1 \cdot d_{1\lambda})(1 - X_2 + X_2 \cdot d_{2\lambda})(1-X_3 + X_3 \cdot d_{3\lambda}) \qquad (5)$$

When $X_R$, $Y_R$, and $Z_R$ of formula 2, that is, the tristimulus values of the reproduced colors that are the synthetic reflection characteristic of the unit area of FIG. 1 are determined, there results:

$$X_R = C_1 \int (P_{0\lambda})(C_{0\lambda})(1-X_1+X_1 \cdot d_{1\lambda})(1-X_2+X_2 \cdot d_{2\lambda})(1-X_3 + X_3 \cdot d_{3\lambda}) \bar{x}\, d\lambda$$
$$Y_R = C_1 \int (P_{0\lambda})(C_{0\lambda})(1-X_1+X_1 \cdot D_{1\lambda})(1-X_2+X_2 \cdot d_{2\lambda})(1-X_3 + X_3 \cdot D_{3\lambda}) \bar{y}\, d\lambda$$
$$Z_r = C_1 \int (P_{0\lambda})(C_{0\lambda})(1-X_1+X_1 \cdot d_{1\lambda})(1-X_2+X_2 \cdot d_{2\lambda})(1-X_3 + X_3 \cdot d_{3\lambda}) \bar{z}\, d\lambda \qquad (6)$$

The following are then substituted for formula 6:

$$X_R = (1-X_1+X_1 \cdot d_{11})(1-X_2+X_2 \cdot d_{12})(1-X_3+X_3 \cdot d_{13}) \int (P_{0\lambda})(C_{0\lambda}) \bar{x}\, d\lambda$$
$$Y_R = (1-X_1+X_1 \cdot d_{21})(1-X_2+X_2 \cdot d_{22})(1-X_3+X_3 \cdot d_{23}) \int (P_{0\lambda})(C_{0\lambda}) \bar{y}\, d\lambda$$
$$Z_R = (1-X_1+X_1 \cdot d_{31})(1-X_2+X_2 \cdot d_{32})(1-X_3+X_3 \cdot d_{33}) \int (P_{0\lambda})(C_{0\lambda}) \bar{z}\, d\lambda \qquad (7)$$

Figure 3:
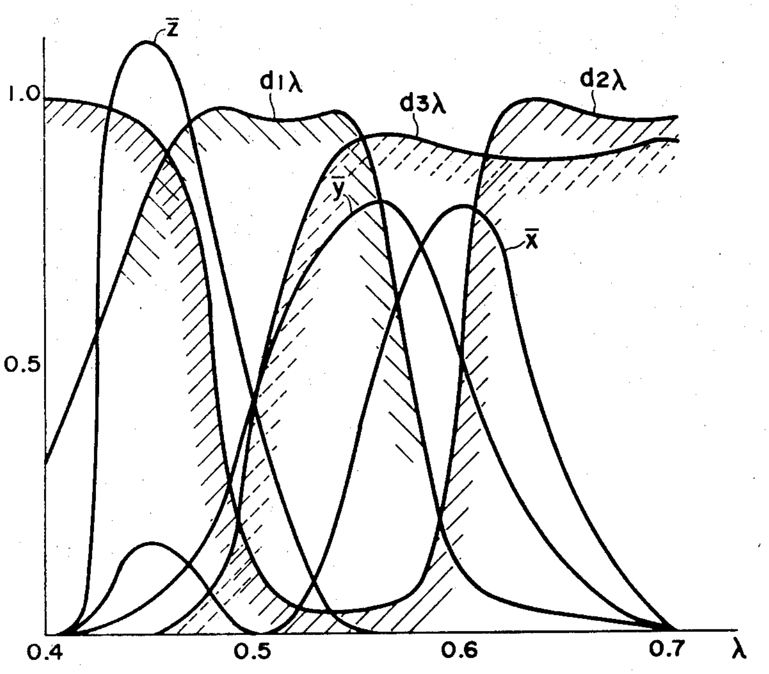
FIG. 3 is a graph showing one example of the spectral transmission characteristics of the transparent color material in three colors used in printing and its tristimulus value.

Hereupon, $d_{11}$, $d_{12}$, $d_{13}$, $d_{21}$, $d_{22}$, $d_{23}$, $d_{31}$, $d_{32}$, $d_{33}$ respectively are coefficients established so that formula (7) may be constituted with respect to $d_{1\lambda}$, $d_{2\lambda}$ and $d_{3\lambda}$, whose physical sense becomes clear when it is considered as follows. Specifically, for example, 1 denotes the dot of cyanine ink, 2, denotes the dot of Magenta ink, and 3 denotes the dot of yellow ink, and $d_{1\lambda}$, $d_{2\lambda}$, and $d_{3\lambda}$ respectively denote their spectral transmittivities as illustrated in FIG. 3. When grey color is expressed by the above inks, it is cyanine ink that limits the reflectance of reflected light $R\lambda$ with respect to red light, and other inks, practically speaking, transmit red light with respect to the incident light and the reflected light from the ground paper. Similarly, it is Magenta ink that limits the reflectance of reflected light $R\lambda$ with respect to green color, and other inks, practically speaking, transmit green color. Moreover, it is yellow ink that limits the reflectance of reflected light $R\lambda$ with respect to blue light, and other inks, practically speaking, transmit blue light.

Accordingly, when $X_R$, $Y_R$, and $Z_R$ of formula 6 respectively are approximated as constants of $d_{2\lambda} \approx 1$. $d_{3\lambda} \approx 1$ and $d_{1\lambda} \neq 1$ within an effective integral interval, these are expressed as follows:

$$X_R \approx (1-X_1+X_1 \cdot d_{11}) \quad C_1 \int (P_{0\lambda})(C_{0\lambda}) \bar{x} d\lambda$$
$$Y_R \approx (1-X_2+X_2 \cdot d_{22}) \quad C_1 \int (P_{0\lambda})(C_{0\lambda}) \bar{y} d\lambda$$
$$Z_R \approx (1-X_3+X_3 \cdot d_{33}) \quad C_1 \int (P_{0\lambda})(C_{0\lambda}) \bar{z} d\lambda$$

The above formula is an approximation, but formula 7, in which $d_{11}$, $d_{22}$, $d_{33}$, $d_{12}$, $d_{13}$, $d_{21}$, $d_{23}$, $d_{31}$ and $d_{32}$ have been determined so as to establish the equality correctly, is not an approximation with respect to a specific color. Hence, in the formula of $X_R$ there are terms of $(1-X_2+X_2 \cdot d_{12})$ and $(1-X_3+X_3 \cdot d_{13})$, in the formula of $Y_R$ there are terms of $(1-X_1+X_1 \cdot d_{21})$ and $(1-X_3 \; X_3 \cdot d_{23})$, and in the formula of $Z_R$ there are terms of $(1-X_1+X_1 \cdot d_{31})$ and $(1-X_2+X_2 \cdot d_{32})$. However, as may be presumed from the above description, all of these terms have a value of approximately 1, that is, $d_{11}$ has about the same meaning as $d_{1\lambda}$, $d_{22}$ as $d_{2\lambda}$, and $d_{33}$ as $d_{3\lambda}$, and $d_{1\lambda}$ is averaged by $d_{11}$ within the effective range of $x$, $d_{2\lambda}$ by $d_{22}$ within the effective range of $\bar{y}$, $d_{3\lambda}$ by $d_{33}$ within the effective range of $\bar{z}$.

Next, apart from the above, a process, in which transparent color materials which are the same in area as the unit area of plural kinds (three kinds) are superimposed and the thicknesses of those respective layers are adjusted for reproducing those colors, is already known, and even in this case, Beer's law, as hereinabove described, may be considered to hold good. Therefore, $X_T$, $Y_T$ and $Z_T$, which represent tristimulus values of reproduced colors and which contain $T\lambda$ represented as the spectral reflectance of the part of one unit, may be expressed as:

$$X_T = C_3 \int (P_{0\lambda}) \cdot T\lambda \cdot \bar{x}\, d\lambda$$
$$Y_T = C_3 \int (P_{0\lambda}) \cdot T\lambda \cdot \bar{y}\, d\lambda$$
$$Z_T = C_3 \int (P_{0\lambda}) \cdot T\lambda \cdot \bar{z}\, d\lambda$$

The above $T$ is expressed as:

$$T\lambda \quad C_{0\lambda} \cdot (t_{1\lambda})^{D1} \cdot (t_{2\lambda})^{D2} \cdot (t_{3\lambda})^{D3} \qquad (8)$$

In the above formula 8 $C_{0\lambda}$ is the spectral reflectance of the ground paper, as hereinabove described, $t_{1\lambda}$, $t_{2\lambda}$ and $t_{3\lambda}$ are the spectral transmittivity of the unit thickness of these respective layers, and $D_1$, $D_2$, and $D_3$ are the thicknesses of these respective layers.

Now, if the color reproduction of an object is effected completely by this process, it may be expressed as follows:

$$X_T = X_E, \quad Y_T = Y_E, \quad Z_T = Z_E$$

And by placing $Y_T$, $Y_T$, and $Z_T$ equally on the right side of the formula 7, as above described, determines the corresponding relation between $X_1$, $X_2$ and $X_3$ and $D_1$, $D_2$ and $D_3$, and then measuring the thickness of each layers of $D_1$, $D_2$ and $D_3$, $X_1$, $X_2$ and $X_3$ which are areas of those layers may be found. That is, $$X_T = C_3 \int (C_{0\lambda})(P_{0\lambda})\cdot(t_{1\lambda})^{D_1}.(t_{2\lambda})^{D_2}.(t_{3\lambda})^{D_3} \bar{x}\, d\lambda$$
$$Y_T = C_3 \int (C_{0\lambda})(P_{0\lambda})\cdot(t_{1\lambda})^{D_1}.(t_{2\lambda})^{D_2}.(t_{3\lambda})^{D_3} \bar{y}\, d\lambda$$
$$Z_T = C_3 \int (C_{0\lambda})(P_0)\cdot(t_{1\lambda})^{D_1}.(t_{2\lambda})^{D_2}.(t_{3\lambda})^{D_3} \bar{z}\, d\lambda \quad (9)$$

where suitable coefficients within the effective range of $\bar{x}$, $\bar{y}$, and $\bar{z}$ are decided with respect to $t_1$, $t_2$ and $t_{3\lambda}$ and the following formula 10 is substituted for the above formula 9:

$$X_T = (T_{11})^{D_1}\cdot(T_{12})^{D_2}\cdot(T_{13})^{D_3}\, C_3 \int (P_{0\lambda})(C_{0\lambda})\, \bar{x}\, d\lambda$$
$$Y_T = (T_{21})^{D_1}\cdot(T_{22})^{D_2}\cdot(T_{23})^{D_3}\cdot C_3 \int (P_{0\lambda})(C_{0\lambda})\, \bar{y}\, d\lambda$$
$$Z_T = (T_{31})^{D_1}\cdot(T_{32})^{D_2}\cdot(T_{33})^{D_3}\, C_3 \int (P_{0\lambda})(C_{0\lambda})\, \bar{z}\, d\lambda \quad (10)$$

In the physical sense, the above formula 10, specifies the transparency for the primary color of three superimposed color layers with respect to incident tristimulus values such as $\int(P_{0\lambda})\,(C_{0\lambda})\,\bar{x}\,d\lambda$, $\int(P_{0\lambda})\,(C_{0\lambda})\,\bar{y}\,d\lambda$, and $\int(P_{0\lambda})\,(C_{0\lambda})\,\bar{z}\,d\lambda$. For example, $T_{11}$ denotes the transparency for the $\bar{x}$ primary color of the first color layer, $T_{12}$ denotes the transparency for the $\bar{x}$ primary color of the second color layer, and $T_{13}$ denotes the transparency for the $\bar{x}$ primary color of the third color layer. Similarly, $T_{21}$ denotes the transparency for the $\bar{y}$ primary color of the first color layer, $T_{22}$ and $T_{23}$ denote the transparency for the $\bar{y}$ primary colors of the second and the third layers, and $T_{31}$, $T_{32}$ and $T_{33}$ denote the transparency for each of the $\bar{z}$ primary colors of the first, the second and the third layers.

When the right side of formula 10 and that of formula 7 are made equal, the following formula 11, from the correspondence relation of the terms of the above two formulas, results:

$$(T_{11})^{D_1} = (1-X_1\ X_1\cdot d_{11})$$
$$(T_{22})^{D_2} = (1-X_2\ X_2\cdot d_{22})$$
$$(T_{33})^{D_3} = (1-X_3\ X_3\cdot d_{33}) \quad (11)$$

Moreover, nine conditional formulae may be expressed with respect to variables $X_1$, $X_2$ and $X_3$ as follows:

$$(T_{12})^{D_2} = (1-X_2\ X_2\cdot d_{12})$$
$$(T_{13})^{D_3} = (1-X_3\ X_3\cdot d_{13})$$
$$(T_{21})^{D_1} = (1-X_1\ X_1\cdot d_{21})$$
$$(T_{23})^{D_3} = (1-X_3\ X_3\cdot d_{23})$$
$$(T_{31})^{D_1} = (1-X_1\ X_1\cdot d_{31})$$
$$(T_{32})^{D_2} - (1-X_2\ X_2\cdot d_{32})$$

Of nine formulae as above described, three formulae indicated as formula 11 are to be taken to find $X_1$, $X_2$ and $X_3$. This is because every term except diagonal terms in formula 7 has a value of approximately 1, as hereinabove described, and because every term except diagonal terms of $(Tm, n)$ also has a value of approximately 1 for the reason that $(Tm, n)$ in formula 10 (in this case, $m$ denotes 1 or 2 or 3 and $n$ denotes 1 or 2 or 3) consist of the same ink as $(Dm, n)$ in formula 7 and they are different only in their thicknesses. If color reproduction effected by the method in a halftone dot is entirely equivalent to color reproduction effected by varying the thicknesses of transparent layers and then superimposing them and if the ink used in a halftone dot is the same in the spectral transmission characteristics with the transparent color material, one and the same content is expressed by the formula corresponding to formulae 7 and 10, and formula 11 is not an approximate formula but an equation which is precise. Therefore, formula 11 is one approximate solution, as hereinabove described.

$$(1-X_1+X_1\cdot d_{11})\ (T_{11})^{D_1}$$
$$(1-X_2+X_2\cdot d_{22})\ (T_{22})^{D_2}$$
$$(1-X_3+X_3\cdot d_{33})\ (T_{33})^{D_3}$$

of formula 11, which are different from the following formula, becomes a more correct solution.

$$(1-X_1+X_1\cdot d_{11})\ C_1 \int (P_{0\lambda})(C_{0\lambda})\bar{x}\, d\lambda \approx X_E$$
$$(1-X_2+X_2\cdot d_{22})\ C_1 \int (P_{0\lambda})(C_{0\lambda})\bar{y}\, d\lambda \approx Y_E$$
$$(1-X_3+X_3\cdot d_{33})\ C_1 \int (P_{0\lambda})(C_{0\lambda})\bar{z}\, d\lambda \approx Z_E$$

That is, the values of the terms of formula 7 are given by the terms of formula 10.

The logic described above does not include a mathematical approximation and an exact solution is to be obtained with respect to $X_1$, $X_2$ and $X_3$. However, when the integral of formula 6 is expanded into formula 7 and when formula 9 is expanded into formula 10, $d_{11}$, $d_{12}$, $d_{13}$, $d_{21}$, $d_{22}$, $d_{23}$, $d_{31}$, $d_{32}$, $d_{33}$ and $T_{11}$, $T_{12}$, $T_{13}$, $T_{21}$, $T_{22}$, $T_{23}$, $T_{31}$, $T_{32}$, $T_{33}$ are not mathematically speaking formed into those respective groups.

Therefore, as regards these, in order to employ these correctly by observation these physical meanings must be considered.

For example, $d_{11} = \int (d_{1\lambda})\, \bar{x}\, d\lambda / \int d\lambda$ may be found by observing $X_R$ in the case of $X_1=1$, $X_2=X_3=0$ from formula 6. Also, assuming that the thickness of other layers is 0 and the thickness of the ink of halftone dot $X_1$ is 1, $X_T$ may be observed for employing $T_{11}$ by formula 10. And to employ these the assumption $(C_{0\lambda}) = 1$ is used.

The table in FIG. 4 shows the results obtained by substituting observation values for equations as hereinabove described. As regards $x$, $y$, $Y$ in the graph the spectral tristimulus values of CIE are used as they are, the spectral reflectance of a ground paper is assumed as 1, that is, $C_{0\lambda} = 1$, through all wave-lengths, and the spectral transmittivity $d_{1\lambda}$, $d_{2\lambda}$, and $d_{3\lambda}$ of printing ink are predetermined for the reason that, in case of printing, the thickness of ink layers is predetermined, and thus printing ink having the spectral transmission characteristics, as illustrated in FIG. 3, is utilized.

The table of FIG. 4 shows results of eight samples by tristimulus values and the right-hand column of the table shows color differences between objects and color reproduction which, in the NBS unit, are 5 at the minimum and 12 or less at the maximum. Up to now it has been said that those color differences are 30 in general. Hence, according to the present invention, color reproduction may be effected satisfactorily. Thus, it will be seen that color reproduction effected by the method in a halftone dot as hereinabove described is entirely equivalent to color reproduction effected by superimposing transparent color materials, and, further, that the assumption that the spectral transmittivity characteristics of the ink used in a halftone dot be identical with those of the transparent color material layer is right.

Since $X_T$, $Y_T$ and $Z_T$, the left side in formula 10, are equal to the tristimulus values of three primary colors of objects, these may be found by observation. Also, integral $$\int (C_{0\lambda})\bar{x}\cdot d\lambda,\quad \int (C_{0\lambda})\bar{y}\cdot d\lambda,\quad \int (C_{0\lambda})\bar{z}\cdot d\lambda$$

may, if the ground paper to be used is decided, be found by a constant. Moreover, $T_{11}$, $T_{22}$ and $T_{33}$, which may be set beforehand, are the transmittivity with respect to tristimulus values $\bar{x}$, $\bar{y}$ and $\bar{z}$ of the unit thickness of three color layers to be selected.

Accordingly, from values of $X_E$, $Y_E$ and $Z_E$ observed, $X_T$, $Y_T$, and $Z_T$ may be found and thereby $D_1$, $D_2$ and $D_3$, which are the thicknesses of these respective layers, may be determined. In order to find these values $D_1$, $D_2$ and $D_3$ it is convenient to convert both sides of formula 10 into logarithms.

After thickness $D_1$, $D_2$ and $D_3$ as hereinabove described have been found, size $X_1$, $X_2$ and $X_3$ may be decided from formula 11. That is, the solution may be found easily for the reason that three formulae of formula 11 respectively are independent and are a linear formula with respect to variables $X_1$, $X_2$ and $X_3$.

Figure 5:
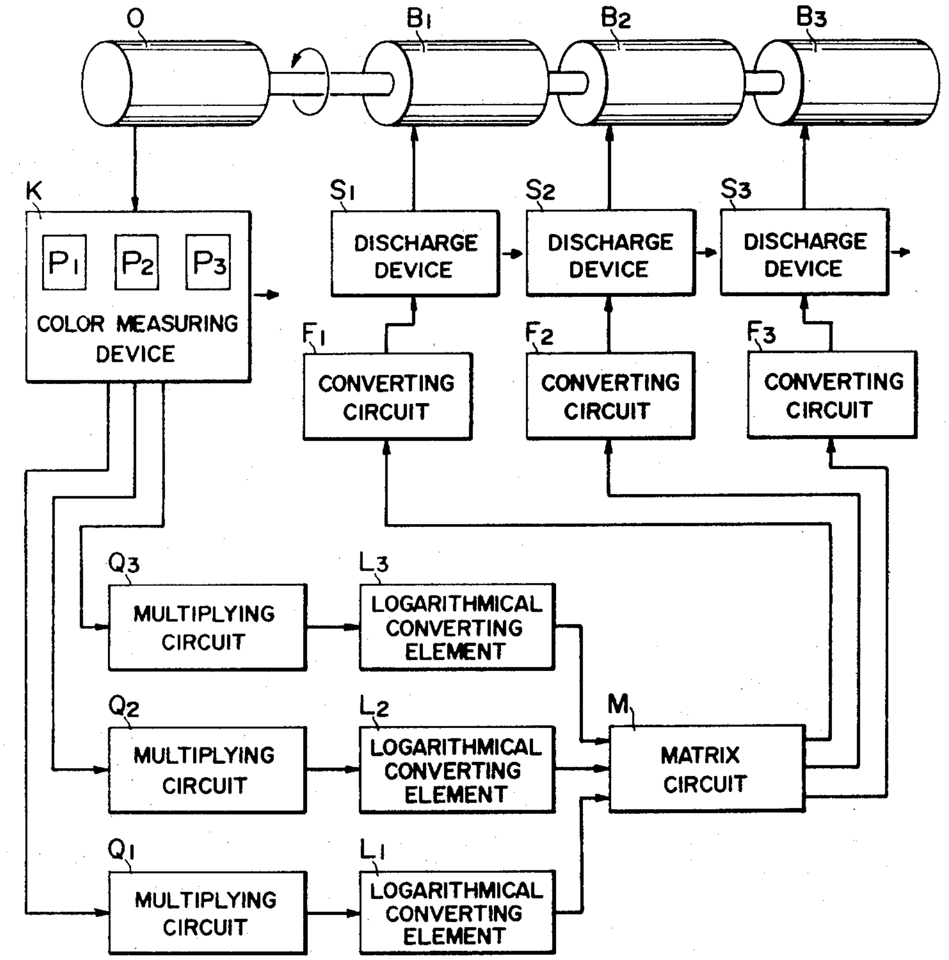
FIG. 5 is a block diagram showing a printing plate producing device which embodies the method according to the present invention.

FIG. 5 is a block diagram showing one embodiment of a color reproduction device embodying the present invention and employing the equations as hereinabove described.

The printing plate is a hole or apertured plate, the plate for each color as hereinabove described is made up of a sheet of vinyl chloride of uniform thickness through which spark discharges pass in order to form halftone dots. The dot areas are adjusted by controlling the discharge currents.

Object or original 0 and plate sheets in three primary colors $B_1$, $B_2$ and $B_3$ respectively are wound on drums which are rotated synchronously. $S_1$, $S_2$ and $S_3$, which are discharge devices, are associated with the drums and are transported simultaneously in the direction of the arrow and color measuring devices also scanning the surface of object 0 are transported in the direction of the arrow at the same time as discharge devices $S_1$, $S_2$ and $S_3$.

Color measuring device K receives light from a small area of object 0, separates said light into three primary colors through a three color separating filter and directs each of said separated rays of light on to respective photometric elements $P_1$, $P_2$ and $P_3$.

From the photometric elements $P_1$, $P_2$ and $P_3$ outputs corresponding to $X_E$, $Y_E$ and $Z_E$ as hereinabove described are obtained. These outputs are connected to respective division circuits $Q_1$, $Q_2$ and $Q_3$ to provide outputs obtained when said outputs are divided by $\int (P_{0\lambda})(C_{0\lambda})\cdot\bar{x}\,d\lambda$, $\int (P_{0\lambda})(C_{0\lambda})\cdot\bar{y}\,d\lambda$, and $\int (P_{0\lambda})(C_{0\lambda})\cdot\bar{z}\,d\lambda$. With respect to the circuit for producing said output, the usual multiplication circuit is utilized, which is sufficed by being multiplied by $1/\int (P_{0\lambda})(C_{0\lambda})\bar{x}\cdot d\lambda$, $1/\int (P_{0\lambda})(C_{0\lambda})\,\bar{y}\cdot d\lambda$, and $1/\int (P_{0\lambda})(C_{0\lambda})\bar{z}^{d}\lambda$ respectively.

The output of division circuits $Q_1$, $Q_2$ and $Q_3$ is connected to logarithmic converting elements $L_1$, $L_2$ and $L_3$ for its logarithmic conversion and is then guided to matrix circuit M, to obtain the following formulae, $D_1$, $D_2$ and $D_3$ being obtained as the output of said matrix circuit M.

$$X_T/(\log \int (P_{0\lambda})(C_{0\lambda})\bar{x}\cdot d\lambda) = (D_1)\log(T_{11})(D_2)\log(T_{12})(D_3)\log(T_{13})$$

$$Y_T/(\log \int (P_{0\lambda})(C_{0\lambda})\bar{y}\cdot d\lambda) = (D_1)\log(T_{21})+(D_2)\log(T_{22})+(D_3)\log(T_{23})$$

$$Z_T/(\log \int (P_{0\lambda})(C_{0\lambda})\bar{z}\cdot d\lambda) = (D_1)\log(T_{31})+(D_2)\log(T_{32})+(D_3)\log(T_{33})$$

$D_1$, $D_2$ and $D_3$ which are the thickness of these respective layers are subjected to the conversion according to formula 11 by means of conversion circuits $F_1$, $F_2$ and $F_3$, as whose output $X_1$, $X_2$ and $X_3$ are obtained and, while controlling discharge currents of discharge devices $S_1$, $S_2$ and $S_3$ in response to values of said $X_1$, $X_2$ and $X_3$, form holes respectively in plate sheets $B_1$, $B_2$ and $B_3$ used for three primary colors by spark discharge.

In general, the spectral characteristics of a color separating filter and a photometric element in a photometric system are difficult to conform with tristimulus values $\bar{x}$, $\bar{y}$, and $\bar{z}$ in the CIE color system. However, when these spectral characteristics are values approximated to $\bar{x}$, $\bar{y}$ and $\bar{z}$ or values approximated to those at a time when $\bar{x}$, $\bar{y}$ and $\bar{z}$ have undergone linear transformation in accordance with the following formula, that is, $$r_1 = (a_{11})\bar{x} + (a_{11})\bar{y} + (a_{13})\bar{z}$$
$$r_2 = (a_{21})\bar{x} + (a_{22})\bar{y} + (a_{23})\bar{z}$$
$$r_3 = (a_{31})\bar{x} + (a_{32})\bar{y} + (a_{33})z$$

the equation according to the present invention may be applied to the above tristimulus values without requiring any treatment.

By doing the usual three color printing with transparent ink by means of plate sheets $B_1$, $B_2$ and $B_3$ used for three primary colors obtained in this way, the thickness of the layer of the halftone formed by a sheet of vinyl chloride is always formed uniformly with respect to its respective colors and the area of the halftone dot is adjusted to reproduce colors correctly for the reason that the thickness of a sheet of vinyl chloride is predetermined with respect to each color, ane hence printed matter, which reproduces faithfully objects as illustrated in FIG. 4, may be obtained.

We claim:

1. A color reproduction method wherein the colors of an object are reproduced on a substrate in the halftone dot of a transparent color material having a predetermined thickness with respect to each of three colors, comprising the steps of:

establishing the thickness ($D_1$) of the first layer, the thickness ($D_2$) of the second layer and the thickness ($D_3$) of the third layer of a transparent color material in said three colors in cases where the colors of said object are reproduced by superimposing three layers of said transparent color material;

determining the transparency for the first primary color ($T_{11}$) of a unit thickness of said first layer, the transparency for the second primary color ($T_{22}$) of a unit thickness of said second layer and the transparency for the third primary color ($T_{33}$) of a unit thickness of said third layer;

determining the transparency for the first primary color ($d_{11}$) of the first primary color halftone dot whose thickness is predetermined by a transparent color material in said three colors, the transparency for the second primary color ($d_{22}$) of the second primary color halftone dot whose thickness is predetermined by said color materials and the transparency for the third primary color ($d_{33}$) of the third primary color halftone dot whose thickness is predetermined by said color materials;

determining the areas of occupancy $(X_1)$,$(X_2)$ and $(X_3)$ of a halftone dot in said three primary colors respectively in said object from the following formula:

$(T_{11})^{D_1} = 1 - X_1 + X_1(d_{11})$ $(T_{22})^{D_2} = 1 - X_2 + X_2(d_{22})$ $(T_{33})^{D_3} = 1 - X_3 + X_3(d_{33})$ and forming a halftone dot in said three primary colors whose area corresponds to said occupancy of area on a substrate.

* * * * *